US006241287B1

(12) United States Patent
Best et al.

(10) Patent No.: US 6,241,287 B1

(45) Date of Patent: Jun. 5, 2001

(54) DUAL COUPON CARD ASSEMBLY

(75) Inventors: Scott D. Best, Troy; James F. Turner, Farmington Hills, both of MI (US)

(73) Assignee: Saxon, Inc., Ferndale, MI (US)

( * ) Notice: Subject to any disclaimer, the term of this patent is extended or adjusted under 35 U.S.C. 154(b) by 0 days.

(21) Appl. No.: 09/545,997

(22) Filed: Apr. 10, 2000

(51) Int. Cl.$^{7}$ .......................... G09B 19/00; B42D 15/00; B65D 77/10

(52) U.S. Cl. ................................ 283/51; 283/67; 283/70; 283/81; 283/101; 283/105; 283/107; 283/108; 493/210; 493/231; 493/243; 493/343; 493/382; 24/487; 24/67.9; 24/67.7

(58) Field of Search ................................ 283/51, 67, 70, 283/81, 101, 105, 107, 108; 493/210, 231, 243, 343, 382; 24/487, 67.9, 67.7

(56) References Cited

U.S. PATENT DOCUMENTS

| | | | |
|---|---|---|---|
| 3,854,229 | 12/1974 | Morgan . | |
| 4,359,358 | 11/1982 | Hattemer . | |
| 4,526,405 | 7/1985 | Hettemer . | |
| 4,601,490 | 7/1986 | Brandon . | |
| 4,767,654 | 8/1988 | Riggsbee . | |
| 4,783,886 * | 11/1988 | Koppe | 24/67.9 |
| 5,021,110 | 6/1991 | Kobayashi . | |
| 5,227,209 | 7/1993 | Garland . | |
| 5,296,279 * | 3/1994 | Birnbaum et al. | 283/71 |
| 5,299,834 | 4/1994 | Kraige . | |
| 5,308,120 | 5/1994 | Thompson . | |
| 5,417,458 | 5/1995 | Best et al. . | |
| 5,466,321 | 11/1995 | Miyaji . | |
| 5,501,491 | 3/1996 | Thompson . | |
| 5,503,436 * | 4/1996 | Alpaugh et al. | 283/71 |
| 5,571,358 | 11/1996 | Napier et al. . | |
| 5,727,817 | 3/1998 | Kraige . | |
| 5,776,287 | 7/1998 | Best et al. . | |

FOREIGN PATENT DOCUMENTS

| | | |
|---|---|---|
| 1292962 | 10/1972 | (GB) . |
| 2213770 | 8/1989 | (GB) . |

OTHER PUBLICATIONS

US Postage Stamp Booklet with self–adhesive stamps.*

* cited by examiner

*Primary Examiner*—A. L. Wellington
*Assistant Examiner*—Mark T. Henderson
(74) *Attorney, Agent, or Firm*—Howard & Howard

(57) ABSTRACT

A coupon card assembly (10) having a first card half (12) and a second card half (14). Both the first (12) and second (14) card halves include a liner (20, 26) and two layers of card stock (22, 24, 28, 30) sandwiching the respective liner (20, 26) therebetween. A number of mini-coupons (36) are detachably cut into each of the card halves (12, 14) through an inner layer of card stock (24, 30). The card assembly (10) is characterized by a living hinge (40) interconnecting the first card half (12) with the second card half (14) to define a dual coupon card assembly (10) wherein the first card half (12) may be folded upon the second card half (14). The subject invention provides a structurally sound coupon card assembly (10) with numerous mini-coupons (36) wherein the coupon card assembly (10) may be folded to form a relatively compact card preferably the size of a standard credit card.

23 Claims, 2 Drawing Sheets

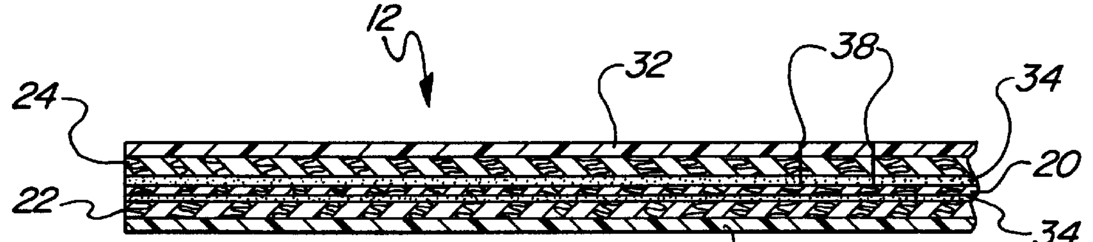
FIG-3
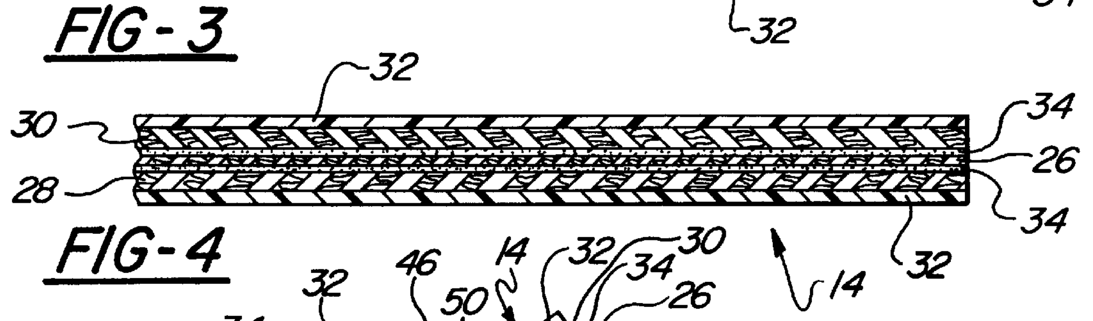
FIG-4
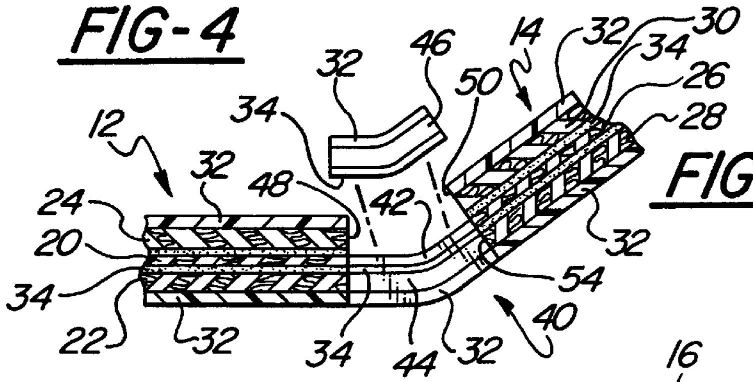
FIG-5
FIG-6
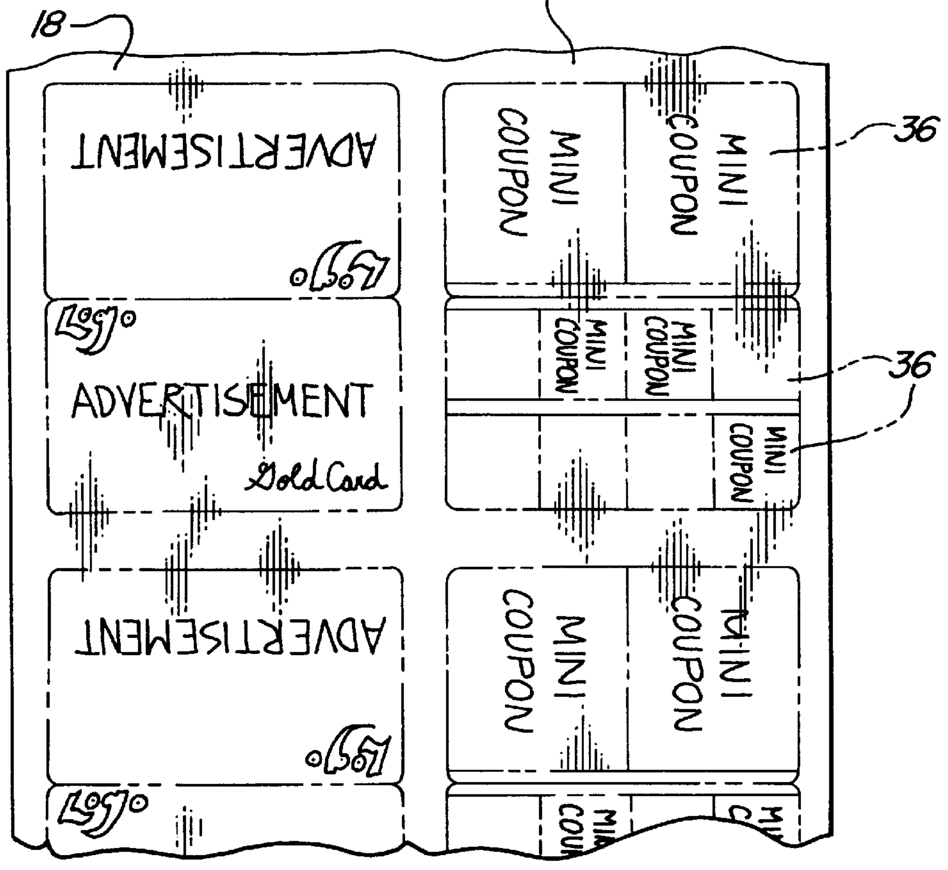

DUAL COUPON CARD ASSEMBLY

BACKGROUND OF THE INVENTION

1. Technical Field

The subject invention relates to a dual coupon card assembly having a plurality of mini-coupons formed therein.

2. Description of the Prior Art

Coupon cards having a number of mini-coupons which may be removed and redeemed are well known. The mini-coupons are a popular means of attracting customers and encouraging additional sales. The prior art coupon cards and mini-coupons have various constructions and are used for a multitude of applications. Examples of some prior art coupon cards and mini-coupons are disclosed in U.S. Pat. Nos. 4,767,654; 5,299,834 and 5,308,120. These prior art coupon cards, however, have a number of deficiencies. Primarily, the mini-coupons are attached to a thin layer of laminated paper such that the coupon cards lack structural integrity once a mini-coupon is removed. Upon removal of a mini-coupon, the laminated paper backing is structurally insufficient for a card that will be repeatedly used. In particular, the coupon card will be bent repeatedly with each removal of the mini-coupons which weakens the bond between the paper and the remaining mini-coupons, as well as having the coupon card bend and fold undesirably.

Another prior art coupon card, having a unique and superior construction, is illustrated in U.S. Pat. No. 5,417,458. The '458 patent is assigned to the assignee of the subject invention and includes a novel structure of two layers of card stock sandwiching a liner with adhesive disposed between each layer of card stock and the liner. The two layers of card stock allow the mini-coupons to be removed while maintaining sufficient integrity and rigidity within the card itself. The mini-coupons are mounted to one side of the coupon card while informational messages, advertisements and the like are printed on and opposite side of the coupon card.

The preferred design for the prior art coupon cards is to have the mini-coupons disposed on one side of the coupon card such that some integrity of the card is remained as the mini-coupons are removed. In order to accommodate numerous mini-coupons on one coupon card, the card itself must be relatively large. Some examples of large coupon cards which may hold a number of mini-coupons are shown in U.S. Pat. Nos. 5,308,120 and 5,501,491. These prior art coupon cards are bulky, cumbersome and cannot be easily transported within a purse, wallet, carrying pouch or the like. These larger coupon cards also suffer from the deficiencies of having a weakened paper backing material.

The deficiencies of the prior art may be overcome by providing a coupon card which can hold numerous mini-coupons, can be manipulated to reduce in overall size, and have sufficient structural integrity to support the coupon card once mini-coupons have been removed. Preferably, the overall size of the coupon card reduces to substantially the same size as a credit card.

SUMMARY OF THE INVENTION AND ADVANTAGES

A coupon card assembly comprising a first card half having a first liner and first and second layers of card stock. The first and second layers of card stock are adhered to the first liner to sandwich the first liner therebetween. A plurality of mini-coupons are detachably cut into the first card half through the second layer of card stock. A second card half has a second liner and third and fourth layers of card stock. The third and fourth layers of card stock are adhered to the second liner to sandwich the second liner therebetween. A plurality of mini-coupons are detachably cut into the second card half through the fourth layer of card stock. The card assembly is characterized by a living hinge interconnecting the first card half with the second card half to define a dual coupon card assembly wherein the first card half may be folded upon the second card half.

Accordingly, the subject invention provides a structurally sound coupon card assembly which may hold numerous mini-coupons and also may be folded to reduce in size. Preferably, the coupon card reduces in size to the size of a standard credit card such that the coupon card may be easily transported in purses, wallets, carrying pouches and the like.

BRIEF DESCRIPTION OF THE DRAWINGS

Other advantages of the present invention will be readily appreciated as the same becomes better understood by reference to the following detailed description when considered in connection with the accompanying drawings wherein:

FIG. 3 is a cross-sectional view taken along line 3—3 of FIG. 1;

FIG. 4 is a cross-sectional view taken along line 4—4 of FIG. 1;

FIG. 5 is a cross-sectional view taken along line 5—5 of FIG. 1; and FIG. 6 is a top view of a series of coupon card assemblies shown during their manufacture.

DETAILED DESCRIPTION OF THE PREFERRED EMBODIMENT

Figure 1:
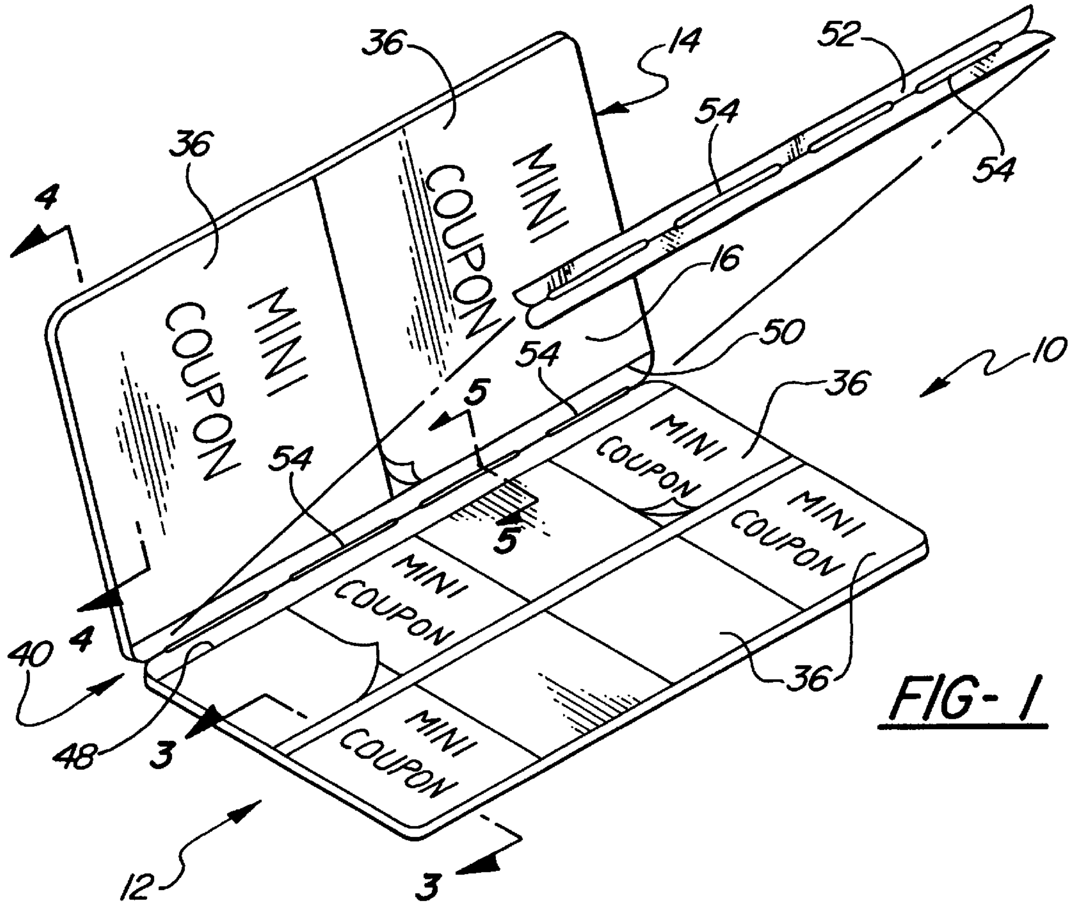
FIG. 1 is a perspective view of a dual coupon card assembly illustrating an inside surface.
Figure 2:
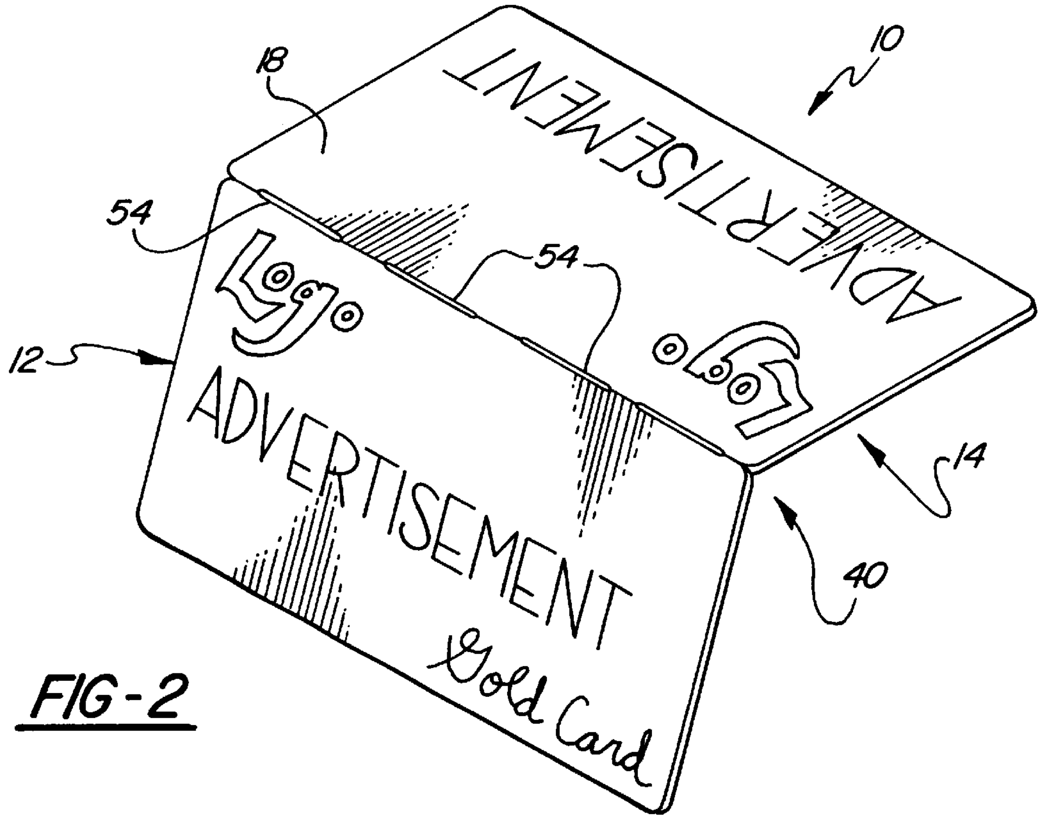
FIG. 2 is a perspective view of the coupon card assembly illustrating an outside surface.

Referring to the Figures, wherein like numerals indicate like or corresponding parts throughout the several views, a coupon card assembly is generally shown at 10 in FIGS. 1 and 2.

The coupon card assembly 10 comprises a first card half 12 interconnected to a second card half 14. The first 12 and second 14 card halves have an identical unique construction which maintains the structural integrity for the card assembly 10. The specific structure is outlined below and claimed in U.S. Pat. No. 5,417,458, which is assigned to the assignee of the subject invention and is herein incorporated by reference.

An interconnection of the first card half 12 to the second card half 14 define a dual coupon card assembly 10 in accordance with the subject invention. As discussed in greater detail below, the interconnection of the first card half 12 to the second card half 14 form a continuous inner sheet of card stock 16, as shown in FIG. 1, and a continuous outer sheet of card stock 18, as shown in FIG. 2. Both the inner 16 and outer 18 sheets of card stock have exterior surfaces with printed matter imprinted thereon. Preferably, as shown in FIG. 1 and as will be discussed in greater detail below, promotional discounts, coupons and related information are imprinted on the exterior surface of the inner sheet of card stock 16. As shown in FIG. 2, informational messages, advertisements, logo's and the like are preferably imprinted on the exterior surface of the outer sheet of card stock 18. As appreciated, any suitable type of information may be printed on either of the inner 16 and outer 18 sheets of card stock.

Referring to FIGS. 3 and 4, the particular structure of the dual coupon card assembly 10 is illustrated in greater detail. In particular, FIG. 3 illustrates the construction of the first card half 12 and FIG. 4 illustrates the construction of the second card half 14.

The construction of the first card half 12 has a first liner 20 and first 22 and second 24 layers of card stock. The first 22 and second 24 layers of card stock are adhered to the first liner 20 to sandwich the first liner 20 therebetween. The construction of the second card half 14 has a second liner 26 and third 28 and fourth 30 layers of card stock. The third 28 and fourth 30 layers of card stock are similarly adhered to the second liner 26 to sandwich the second liner 26 therebetween.

As also discussed in greater detail below, the first 22 and third 28 layers of card stock are interconnected to define the integral homogenous outer sheet of card stock 18. The second 24 and fourth 30 layers of card stock are also interconnected to define the integral homogenous inner sheet of card stock 16. Similarly, the first 20 and second 26 liners are interconnected to define an integral homogenous sheet of liner (not numbered). The interconnection of these layers of card stock 22, 24, 28, 30 and liners 20, 26, completely interconnect the first card half 12 to the second card half 14 to define the dual coupon card assembly 10.

As discussed above, the outer sheet of card stock 18 and the inner sheet of card stock 16 each have an exterior surface. A laminate 32 is adhered to each of the exterior surfaces of the outer 18 and inner 16 sheets of card stock over the printed matter to protect the card assembly 10. The outer 18 and inner 16 sheets of card stock also have interior surfaces with the sheet of liner disposed between the interior surfaces. Adhesive layers 34 are disposed between each of the interior surfaces of the outer 18 and inner 16 sheets of card stock and the sheet of liner to adhere the sheets of card stock 16, 18 to the sheet of liner.

As eluded to above and as best shown in FIG. 1, a plurality of mini-coupons 36 are detachably cut into the first card half 12 through the second layer of card stock 24. Similarly, a plurality of mini-coupons 36 are detachably cut into the second card half 14 through the fourth layer of card stock 30. Preferably, the mini-coupons 36 are cut such that, once removed, the mini-coupons 36 include a layer of card stock 24, 30 covered with a laminate 32 and having an adhesive layer 34. Hence, mini-coupons 36 removed from the first card half 12 will include a portion of the second layer of card stock 24, the laminate 32 and the associated adhesive layer 34. Mini-coupons 36 removed from the second card half 14 will include a portion of the fourth layer of card stock 30, the laminate 32 and associated adhesive layer 34. Cuts 38 scored through the second layer of card stock 24 in the first card half 12 are illustrated in FIG. 3. In particular, the cuts 38 pass through the laminate 32, the second layer of card stock 24 and through the adhesive layer 34. It is desirable to have the adhesive layer 34 removed with the mini-coupons 36 such that the mini-coupons 36 may be adhered to a redemption sheet at a place of purchase. In addition, the area of the coupon card assembly 10 that was occupied by the mini-coupon 36 does not have a "tacky" feel which may be irritating to a user. It is appreciated that the mini-coupons 36 may be of any suitable size or configuration with any suitable type of promotional indica disposed thereon. Two different sized mini-coupons 36 are illustrated in FIG. 1.

The card assembly 10 is characterized by a living hinge 40 interconnecting the first card half 12 with the second card half 14 to define the dual coupon card assembly 10 wherein the first card half 12 may be folded upon the second card half 14. The dual coupon card assembly 10 is illustrated in a partially folded position in FIGS. 1 and 2. It is appreciated that the first card half 12 may be completely folded upon the second card half 14 such that the second layer of card stock 24 overlays the fourth layer of card stock 30. In other words, the inner sheet of card stock 16 will be sandwiched between the outer sheet of card stock 18.

Referring also to FIG. 5, the construction of the living hinge 40 includes a hinge liner 42 and fifth 44 and sixth 46 layers of card stock. The fifth 44 and sixth 46 layers of card stock are adhered to the hinge liner 42 to sandwich the hinge liner 42 therebetween. Preferably, the fifth layer of card stock 44 interconnects the first 22 and third 28 layers of card stock and the sixth layer of card stock 46 interconnects the second 24 and fourth 30 layers of card stock. Similarly, the hinge liner 42 interconnects the first 22 and second 26 liners to completely interconnect the first 12 and second 14 card halves.

Even more preferably, the first 22, third 28 and fifth 44 layers of card stock further define the integral homogenous outer sheet of card stock 18 and the second 24, fourth 30 and sixth 46 layers of card stock further define the integral homogenous inner sheet of card stock 16. Similarly, the first 20, second 26 and hinge 42 liners further define the integral homogenous sheet of liner. These homogenous sheets of card stock 16, 18 and liner uniformly form the dual coupon card assembly 10.

As best shown in FIGS. 1 and 5, a first center score line 48 is cut through the second layer of card stock 24 in the first card half 12 spaced from the hinge 40. Similarly, a second center score line 50 is cut through the fourth layer of card stock 30 in the second card half 14 spaced from the hinge 40. The first 48 and second 50 center score lines define a removable center strip 52. The first 48 and second 50 center score lines are substantially parallel with the hinge 40 and span an entire width of the respective card halves 12, 14 such that the center strip 52 may be removed from the card assembly 10 thereby further defining the living hinge 40 as the outer sheet of card stock 18 and the sheet of liner. Preferably, the hinge 40 includes the fifth layer of card stock 44, associated laminate 32 and adhesive layer 34 and hinge liner 42. Hence, the center strip 52 includes the sixth layer of card stock 46, associated laminate 32 and adhesive layer 34 as well as a portion of the second 24 and fourth 30 layers of card stock, associated laminate 32 and adhesive layer 34. The center strip 52 is preferably shown as a substantially rectangular shaped strip 52. It is appreciated that the center strip 52 may be of any suitable shape or design. In addition, the center strip 52 may have an alternative construction than preferred without deviating from the scope of the subject invention.

The living hinge 40 includes at least one notch 54 formed therein for creating a plurality of living hinge sections (not numbered) with each of the hinge sections interconnecting the first 12 and second 14 card halves. Preferably, the notches 54 span a majority of a length of the living hinge 40 such that the living hinge sections fold when the first card half 12 is folded upon the second card half 14. In other words, the living hinge sections are relatively small in comparison to the overall width of the coupon card assembly 10. The combination of the hinge sections with the removed center strip 52 creates a easily folded dual coupon card assembly 10. It is appreciated that during the manufacture of the card assembly, the notches 54 are also formed in the center strip 52.

The removal of the center strip 52 is particularly advantageous in that the hinge sections are not unnecessarily stressed and can therefore be made smaller. It should be appreciated that the notches 54 may be of any suitable size or length or even eliminated altogether. The removal of the center strip 52 allows the living hinge 40 to be folded with or without the formation of the notches 54.

Referring to FIG. 6, a series of coupon card assemblies 10 are shown. In particular, the series of cards is further defined as a series of outer sheets of card stock 18 and a series of inner sheets of card stock 16. Each series has substantially the same printed matter disposed on each exterior surface of the outer 18 and inner 16 sheets of card stock for creating a series of substantially identical dual coupon card assemblies 10. This series of dual coupon card assemblies 10 is preferably manufactured in accordance with U.S. Pat. No. 5,776,287 which is assigned to the assignee of the subject invention and is herein incorporated by reference.

At this stage of the manufacturing process, the series of card halves 12, 14 have been completed printed. The phantom lines illustrate the positions where the coupon card assembly 10 will be punched and scored. As clearly disclosed in the '287 patent, the series of inner sheets of card stock 16 will preferably be flipped over and adhered to the series of outer sheets of card stock 18 to form the dual coupon card assemblies 10 having a superior construction.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be any way limiting, the invention may be practiced otherwise than as specifically described.

What is clamed is:

1. A coupon card assembly (10) comprising;

a first card half (12) having a first liner (20) and first (22) and second (24) layers of card stock, said first (22) and second (24) layers of card stock adhered to said first liner (20) to sandwich said first liner (20) therebetween, a second card half (14) having a second liner (26) and third (28) and fourth (30) layers of card stock, said third (28) and fourth (30) layers of card stock adhered to said second liner (26) to sandwich said second liner (26) therebetween, a plurality of mini-coupons (36) detachably cut into at least one of said first card half (12) through said second layer of card stock (24) and said second card half (14) through said fourth layer of card stock (30), a living hinge (40) having a hinge liner (42) and fifth (44) and sixth (46) layers of card stock and interconnecting said first card half (12) with said second card half (14) to define a dual coupon card assembly (10) wherein said first card half (12) may be folded upon said second card half (14), said card assembly (10) characterized by a first center score line (48) cut through said second layer of card stock (24) in said first card half (12) spaced from said hinge (40) and a second center score line (50) cut through said fourth layer of card stock (30) in said second card half (14) spaced from said hinge (40) to define a removable center strip (52), and said first (22), third (28), and fifth (44) layers of card stock defining an integral homogenous outer sheet of card stock (18); said first (20), second (26), and hinge (42) liners defining an integral homogenous sheet of liner; and said second (24), fourth (30), and sixth (46) layers of card stock defining an integral homogenous inner sheet of card stock (16) to uniformly form said dual coupon card assembly (10).

2. An assembly as set forth in claim 1 wherein said fifth (44) and sixth (46) layers of card stock are adhered to said hinge liner (42) to sandwich said hinge liner (42) therebetween.

3. An assembly as set forth in claim 1 wherein said first (48) and second (50) center score lines are substantially parallel with said hinge (40) and span an entire width of said respective card halves (12, 14) such that said center strip (52) may be removed from said card assembly (10) thereby further defining said living hinge (40) as said outer sheet of card stock (18) and said sheet of liner.

4. An assembly as set forth in claim 1 wherein said living hinge (40) includes at least one notch (54) formed therein for creating a plurality of living hinge sections with each of said hinge sections interconnecting said first (12) and second (14) card halves.

5. An assembly as set forth in claim 1 wherein said outer sheet of card stock (18) and said inner sheet of card stock (16) each have exterior and interior surfaces with said sheet of liner disposed between said interior surfaces.

6. An assembly as set forth in claim 1 wherein a plurality of mini-coupons are detachably cut into both of said first card half (12) through said second layer of card stock (24) and said second card half (14) through said fourth layer of card stock (30).

7. An assembly as set forth in claim 2 wherein said fifth layer of card stock (44) interconnects said first (22) and third (28) layers of card stock, said sixth layer of card stock (46) interconnects said second (24) and fourth (30) layers of card stock and said hinge liner (42) interconnects said first (20) and second (26) liners to completely interconnect said first (12) and second (14) card halves.

8. An assembly as set forth in claim 4 wherein said notches (54) span a majority of a length of said living hinge (40) such that said living hinge sections fold when said first card half (12) is folded upon said second card half (14).

9. An assembly as set forth in claim 5 further including adhesive layers (34) disposed between each of said interior surfaces of said outer (18) and inner (16) sheets of card stock and said sheet of liner to adhere said sheets of card stock (16, 18) to said sheet of liner.

10. An assembly as set forth in claim 9 further including printed matter imprinted on each of said exterior surfaces of said outer (18) and inner (16) sheets of card stock.

11. An assembly as set forth in claim 10 further including a laminate (32) adhered to each of said exterior surfaces of said outer (18) and inner (16) sheets of card stock over said printed matter to protect said card assembly (10).

12. An assembly as set forth in claim 11 further including a series of card assemblies (10) with each series having substantially the same printed matter disposed on each exterior surface of said outer (18) and inner (16) sheets of card stock for creating a series of substantially identical dual coupon card assemblies (10).

13. A coupon card assembly (10) comprising;

a first card half (12) having a first liner (20) and first (22) and second (24) layers of card stock, said first (22) and second (24) layers of card stock adhered to said first liner (20) to sandwich said first liner (20) therebetween, a second card half (14) having a second liner (26) and third (28) and fourth (30) layers of card stock, said third

(28) and fourth (30) layers of card stock adhered to said second liner (26) to sandwich said second liner (26) therebetween, a plurality of mini-coupons (36) detachably cut into at least one of said first card half (12) through said second layer of card stock (24) and said second card half (14) through said fourth layer of card stock (30), a living hinge (40) having a hinge liner (42) and fifth (44) and sixth (46) layers of card stock and interconnecting said first card half (12) with said second card half (14) to define a dual coupon card assembly (10) wherein said first card half (12) may be folded upon said second card half (14), at least one notch (54) formed within said living hinge (40) for creating a plurality of living hinge sections with each of said hinge sections interconnecting said first (12) and second (14) card halves, and said first (22), third (28), and fifth (44) layers of card stock defining an integral homogenous outer sheet of card stock (18); said first (20), second (26), and hinge (42) liners defining an integral homogenous sheet of liner; and said second (24), fourth (30), and sixth (46) layers of card stock defining an integral homogenous inner sheet of card stock (16) to uniformly form said dual coupon card assembly (10).

14. An assembly as set forth in claim 13 wherein said fifth (44) and sixth (46) layers of card stock are adhered to said hinge liner (42) to sandwich said hinge liner (42) therebetween.

15. An assembly as set forth in claim 13 wherein a plurality of mini-coupons are detachably cut into both of said first card half (12) through said second layer of card stock (24) and said second card half (14) through said fourth layer of card stock (30).

16. An assembly as set forth in claim 13 further including a first center score line (48) cut through said second layer of card stock (24) in said first card half (12) spaced from said hinge (40) and a second center score line (50) cut through said fourth layer of card stock (30) in said second card half (14) spaced from said hinge (40) to define a removable center strip (52).

17. An assembly as set forth in claim 13 wherein said notches (54) span a majority of a length of said living hinge (40) such that said living hinge sections fold when said first card half (12) is folded upon said second card half (14).

18. An assembly as set forth in claim 13 further including adhesive layers (34) disposed between each of said interior surfaces of said outer (18) and inner (16) sheets of card stock and said sheet of liner to adhere said sheets of card stock (16, 18) to said sheet of liner.

19. An assembly as set forth in claim 14 wherein said fifth layer of card stock (44) interconnects said first (22) and third (28) layers of card stock, said sixth layer of card stock (46) interconnects said second (24) and fourth (30) layers of card stock and said hinge liner (42) interconnects said first (20) and second (26) liners to completely interconnect said first (12) and second (14) card halves.

20. An assembly as set forth in claim 16 wherein said first (48) and second (50) center score lines are substantially parallel with said hinge (40) and span an entire width of said respective card halves (12, 14) such that said center strip (52) may be removed from said card assembly (10) thereby further defining said living hinge (40) as said outer sheet of card stock (18) and said sheet of liner.

21. An assembly as set forth in claim 18 further including printed matter imprinted on each of said exterior surfaces of said outer (18) and inner (16) sheets of card stock.

22. An assembly as set forth in claim 21 further including a laminate (32) adhered to each of said exterior surfaces of said outer (18) and inner (16) sheets of card stock over said printed matter to protect said card assembly (10).

23. An assembly as set forth in claim 22 further including a series of card assemblies (10) with each series having substantially the same printed matter disposed on each exterior surface of said outer (18) and inner (16) sheets of card stock for creating a series of substantially identical dual coupon card assemblies (10).

* * * * *